United States Patent
Chen

(10) Patent No.: US 7,965,942 B2
(45) Date of Patent: *Jun. 21, 2011

(54) INFRARED REMOTE CONTROL MODULE AND PORTABLE ELECTRONIC DEVICE USING SAME

(75) Inventor: Ga-Lane Chen, Santa Clara, CA (US)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 833 days.

This patent is subject to a terminal disclaimer.

(21) Appl. No.: 11/935,362

(22) Filed: Nov. 5, 2007

(65) Prior Publication Data

US 2008/0152347 A1   Jun. 26, 2008

(30) Foreign Application Priority Data

Dec. 22, 2006   (CN) .......................... 2006 1 0157876

(51) Int. Cl.
*H04B 10/00* (2006.01)
(52) U.S. Cl. ........ 398/106; 398/212; 398/128; 398/130; 398/135; 345/156; 345/158; 250/330; 250/339.01; 340/825.22; 340/825.69; 340/825.72; 348/734
(58) Field of Classification Search .................. 398/106, 398/107, 202, 212, 115, 116, 117, 118, 128, 398/130, 135, 137, 138, 164, 127, 208, 209; 345/158, 156, 471; 250/330, 339.01, 370.06, 503.01; 340/825.22, 825.69, 825.72; 348/734
See application file for complete search history.

(56) References Cited

U.S. PATENT DOCUMENTS

| | | | |
|---|---|---|---|
| 6,347,999 B1 | 2/2002 | Yuan | |
| 2007/0222750 A1* | 9/2007 | Ohta | 345/158 |
| 2008/0131131 A1* | 6/2008 | Chen | 398/106 |

* cited by examiner

*Primary Examiner* — Hanh Phan
(74) *Attorney, Agent, or Firm* — Jeffrey T. Knapp

(57) ABSTRACT

An infrared remote control module (10) includes an infrared detecting module (11) configured for receiving optical signals and converting the optical signals into digital signals, a signal processing module (12) communicating with the infrared detecting module; and a controlling feedback module (13) communicating with the signal processing module. The infrared detecting module includes a lens barrel (110), an infrared band-pass filter (112) arranged in the lens barrel, a lens assembly (113) arranged in the lens barrel, an image pickup module (114) arranged in the lens barrel, and a collimator device (116) selectably moveable into or out from the lens barrel. By being moveable in such a fashion, the collimator device is configured for selectively collimating the optical signals, and, thus, the remote control module can be used for shooting or motion-based actions.

19 Claims, 6 Drawing Sheets

INFRARED REMOTE CONTROL MODULE AND PORTABLE ELECTRONIC DEVICE USING SAME

BACKGROUND OF THE INVENTION

1. Field of the Invention

The present invention relates to remote control modules and, particularly, to an infrared remote control module and a portable electronic device having the same.

2. Description of Related Art

With the rapid development of technology, portable electronic devices, such as digital cameras and mobile phones, are widely used. Furthermore, portable electronic devices are gaining more and more functions. For example, mobile phones with camera modules have the function of photography, in addition to their conventional uses. In addition, other mobile phones have audio/video media players installed therein to provide more entertainment capabilities.

Computer games, especially simulation games, are more and more popular in the modern society. A system emulating a game console generally includes a host in communication with a display device, for displaying images; and a console in communication with the host, for performing various playing operations.

However, since different types of games have different playing operations, different types of consoles are typically needed for playing different type of games. For example, the consoles for shooting games are generally unavailable for motion-based games, e.g., swinging, throwing, or hitting games. Thus, the customers generally have needed different kinds of consoles for playing the shooting games, compared to those used for playing the motion-based games. Therefore, additional expenses or costs may be necessary for a customer who may want to play shooting games as well as the other types of games addressed above. Moreover, having two or more consoles may cause mobility inconveniences. Furthermore, the game consoles generally have not been able to be readily integrated into portable electronic devices.

What is needed, therefore, is a remote control module, which selectably permits shooting (i.e., point-focused) actions or motion-based actions (e.g., swinging, hitting, etc.) to be simulated, that can be incorporated into a portable electronic device.

SUMMARY OF THE INVENTION

An infrared remote control module, according to a preferred embodiment, includes an infrared detecting module configured for receiving optical signals and converting the optical signals into digital signals, a signal processing module communicating with the infrared detecting module, and a controlling feedback module communicating with the signal processing module. The infrared detecting module includes a lens barrel, an infrared band-pass filter arranged in the lens barrel, a lens assembly arranged in the lens barrel, an image pickup module arranged in the lens barrel, and a collimator device selectably moveable into or out of the lens barrel. The infrared band-pass filter, the lens assembly, and the image pickup module are coaxially placed/aligned together. The infrared band-pass filter is configured for permitting infrared optical signals into the lens barrel and filtering other optical signals. The image pickup module is configured for converting the infrared optical signals into the digital signals.

The present infrared remote control module employs the collimator device, which may be selectively placed within or moved away from (i.e., out of) the lens barrel, such controlled placement thereby facilitating playing a shooting (i.e., a point-focus action) game and at least one other game requiring a non-shooting, motion-based action (e.g., swinging, hitting, etc.). Therefore, the infrared remote control module may be applied to electronic devices for playing different types of games, such as shooting games, swing, ball or hitting games.

Other advantages and novel features of the present invention will become more apparent from the following detailed description of at least one preferred embodiment when taken in conjunction with the accompanying drawings.

BRIEF DESCRIPTION OF THE DRAWINGS

Many aspects of the present infrared remote control module can be better understood with reference to the following drawings. The components in the drawings are not necessarily to scale, the emphasis instead being placed upon clearly illustrating the principles of the present infrared remote control module. Moreover, in the drawings, like reference numerals designate corresponding parts throughout the several views.

DETAILED DESCRIPTION OF THE INVENTION

Reference will now be made to the drawings to describe, in detail, at least one preferred embodiment of the present infrared remote control module.

Figure 1:
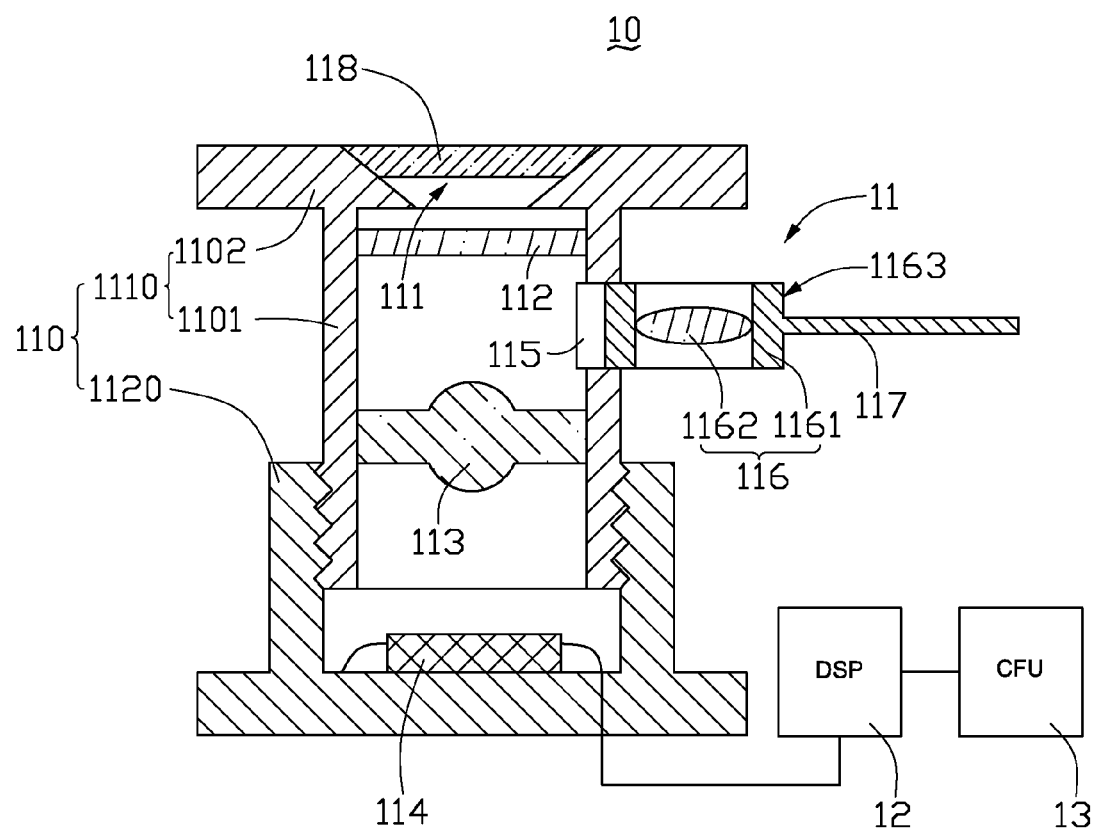
FIG. 1 is a schematic, cross-sectional view of an infrared remote control module, according to a first embodiment of the present infrared remote control module.

Referring to FIG. 1, an infrared remote control module 10, in accordance with a first embodiment, includes an infrared detecting module 11 configured (i.e., structured and arranged) for receiving optical signals from a host (not shown) and converting the optical signals into digital signals, a signal processing module 12 configured for processing the digital signals to produce a controlling signal, and a controlling feedback module 13 configured for feeding back the controlling signal to enable performance of a remote control function.

The infrared detecting module 11 includes a lens barrel 110, an infrared band-pass filter 112, a lens assembly 113, an infrared image pickup module 114, and a collimator device 116. The infrared band-pass filter 112, the lens assembly 113, and the infrared image pickup module 114 are coaxially arranged in series in the lens barrel 110.

The lens barrel 110 includes a base support 1120 and a main body 1110 threadedly engaged with the base support 1120. The main body 1110 has a top portion 1102 and a sidewall 1101 extending from the top portion 1102. An incidence opening 111 is defined at/within the top portion 1102 and is configured for permitting the optical signals to be transmitted into the lens barrel 110. Furthermore, a protecting transparent cover 118 may be mounted within the incidence opening 111 of the top portion 1102 so as to extend across the incidence opening 111 and thereby prevent dust and/or moisture from flowing/entering into the lens barrel 110. That is, the protecting transparent cover 118 sealingly fits in the top portion 1102, within the incidence opening 111, and is advantageously bevel/even with the upper face of the top portion 1102. The incidence opening 111, the infrared band-pass filter 112, the lens assembly 113, and the infrared image pickup module 114 are all coaxially aligned with each other. An opening 115 is defined in the sidewall 1101 of the main body 1110 and is sized and arranged for permitting the collimator device 116 to be selectably pushed into or pulled out from the lens barrel 110. The opening 115 has a shape, in particular, corresponding to the collimator device 116.

The infrared band-pass filter 112 is arranged adjacent to the top portion 1102 of the main body 1110 and is configured for permitting infrared optical signals into the lens barrel 110 and filtering other optical signals. Beneficially, the infrared band-pass filter 112 has a band-pass wavelength in an approximate range of 800~1100 nanometers, permitting infrared optical signals, which have wavelengths in that approximate range, to transmit into the lens barrel 110 while filtering out other optical signals.

The lens assembly 113 includes at least one aspheric lens. Usefully, an anti-reflective coating is provided on the aspheric lens 113 to reduce the reflection of the infrared light.

The infrared image pickup module 114 is mounted on the base support 1120 to enable image formation. The infrared image pickup module 114 is, opportunely, a charge coupled device (CCD) or a complementary metal-oxide semiconductor (CMOS).

The collimator device 116 is slidably received through the opening 115 in the sidewall 1101 and may be selectably moved into or out of the lens barrel 110. The collimator device 116 includes a collimator 1162 and a fixing ring 1161 in which the collimator 1162 is mounted and received. Furthermore, the collimator device 116 may, advantageously, further include an operation handle 117 extending from the fixing ring 1161, by which pulling/pushing (i.e., selective positioning) of the collimator device 116 can be achieved. Opportunely, the fixing ring 1161 has an outer diameter same as the inner diameter of the lens barrel 110. When the collimator device 116 is pushed into the lens barrel 110, the collimator 1162 is coaxially and optically arranged with the infrared band-pass filter 112, the lens assembly 113, and the infrared image pickup module 114.

Figure 2:
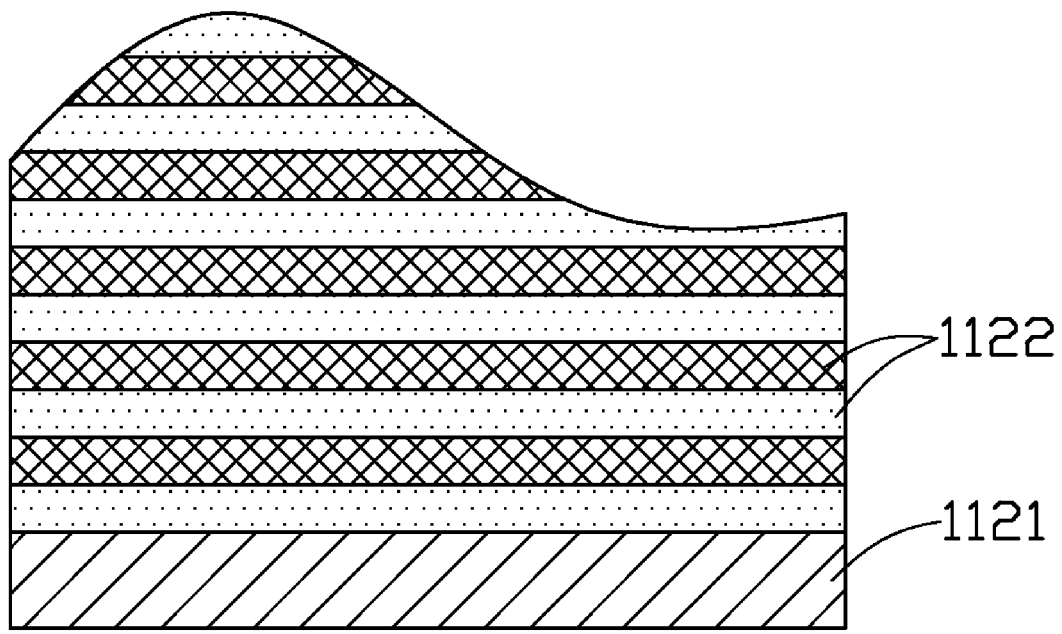
FIG. 2 is a schematic view of an infrared pass-band filter of FIG. 1.

Referring to FIG. 2, the infrared band-pass filter 112 includes a transparent substrate 1121 and a plurality of oxide films 1122 arranged in series thereon. Each oxide films 1122 is consisted of two different oxide coatings associated therewith, each respective coating having a different refractive index. The two different oxide coatings are deposited alternately on the transparent substrate 1121 to form the plurality of oxide films 1122. Beneficially, the oxide coatings may be made of titanium dioxide ($TiO_2$) or silicon dioxide ($SiO_2$).

Figure 3:
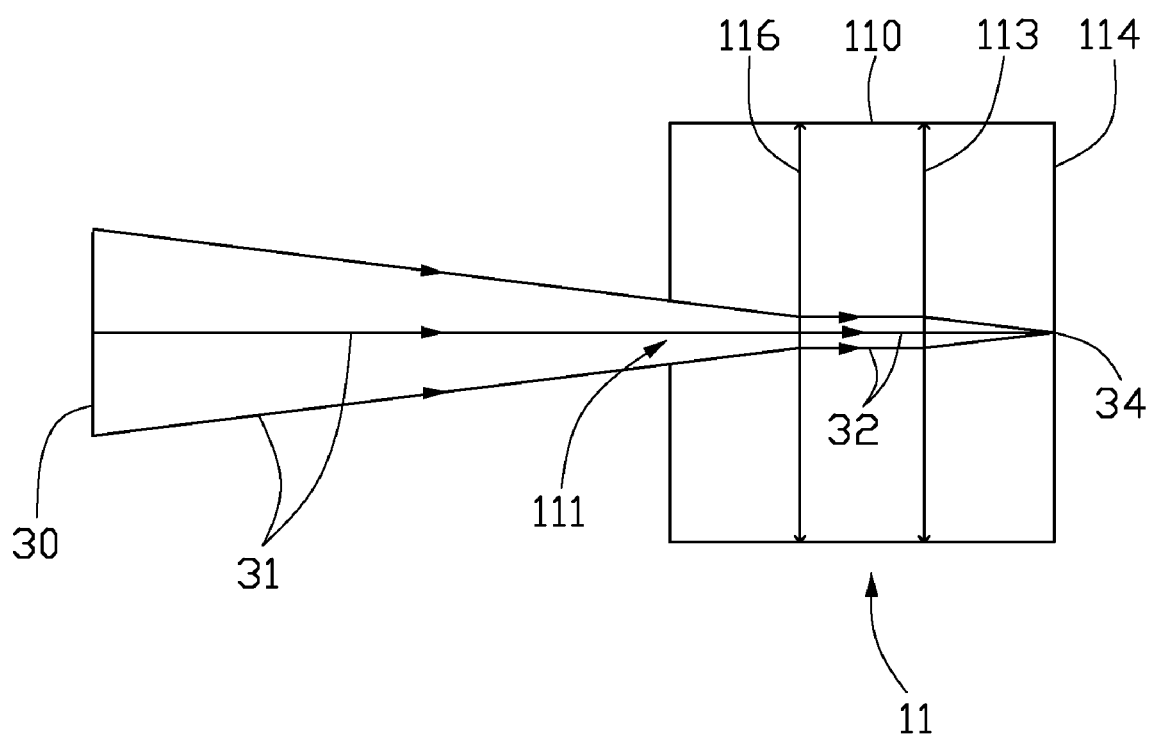
FIG. 3 is a schematic optical-path view of the infrared remote control module, upon selectively pushing the collimator into the lens barrel, as per the first embodiment.

Referring to FIG. 3, when the infrared detecting module 11 is used to play shooting games, the collimator device 116 is pushed into the lens barrel 110. A host 30 sends out optical signals 31, which are infrared optical signals in an approximate range of 800~1100 nanometers. The optical signals 31 pass through the collimator device 116 and are collimated into parallel light beams 32. The parallel light beams 32 then focus together through the lens assembly 113 to form an image 34 within a relatively small area (i.e., a small-area image 34) on the image pickup module 114. The small-area image 34 on the image pickup module 114 may, advantageously, be a point/dot (i.e., a small enough area at least approximating a point/dot to the player of the game) corresponding to the objective signal, such as the aim point of the shooting games. The image pickup module 114 converts the small-area image 34 into digital signals, and then the processing module 12 processes the digital signals to produce a controlling signal. Finally, the controlling feedback module 13 feeds back the controlling signal to the host 30 to simulate the desired shooting (e.g., point-focused or nearly so) action within the games.

Figure 4:
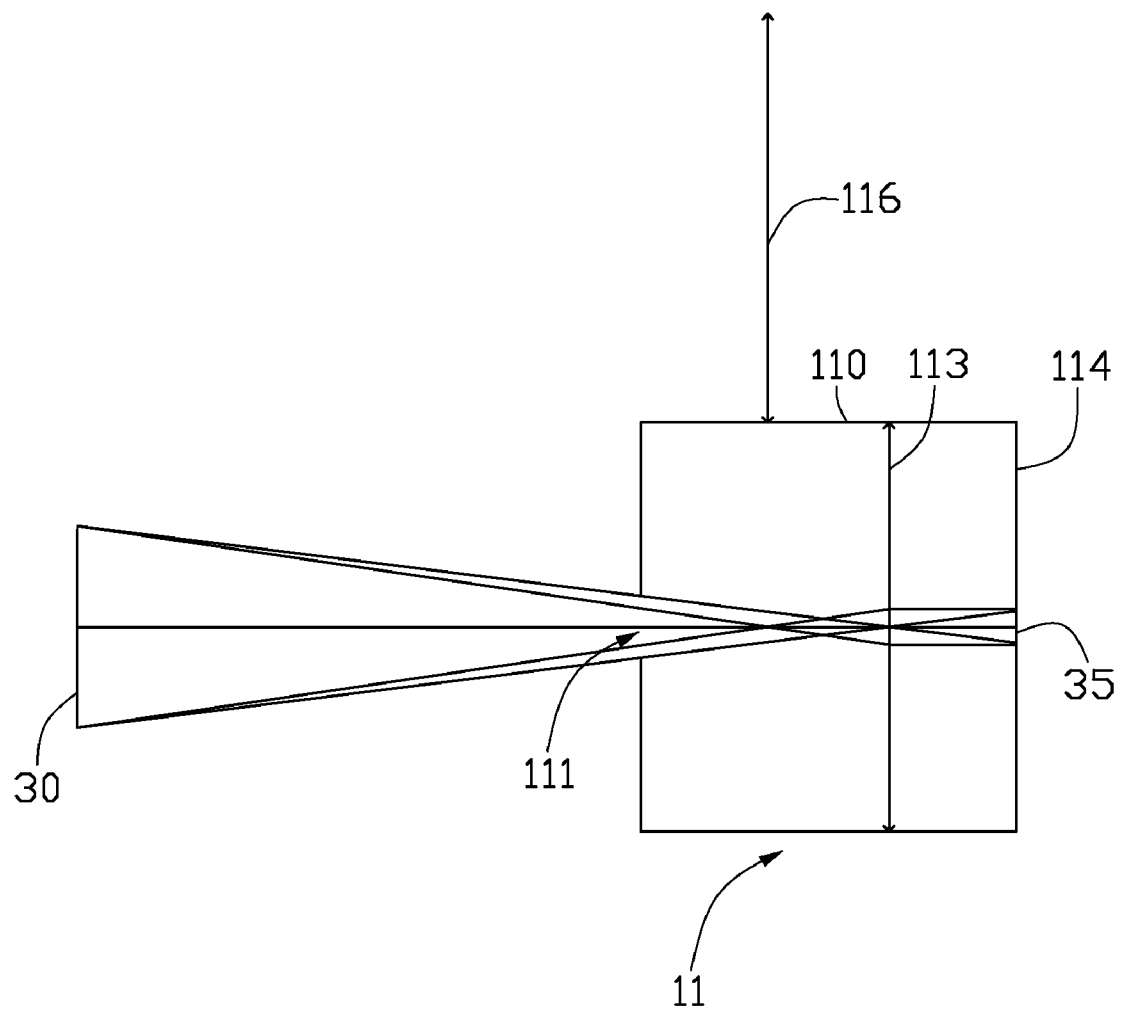
FIG. 4 is a schematic optical-path view of the infrared remote control module, upon selectively pulling the collimator out of the lens barrel, as per the first embodiment.

Referring to FIG. 4, when the infrared detecting module 11 is used to play, e.g., swinging, throwing, and/or hitting games, the collimator device is pulled out of alignment with the optical column of the lens barrel 110 (i.e., the infrared detecting module 11 could be still, partially, positioned at an outer edge of the lens barrel 110 yet be located so to have no effect on light passing through the collimator device 116, such as the case in FIG. 1). The host 30 sends out the optical signals 31, which are infrared optical signals in an approximate range of 800~1100 nanometers. The optical signals 31 form an image 35 within a relatively large area (i.e., large-area image 35) on the image pickup module 114, only through the lens assembly 113 without passing through the collimator device 116. The large-area image 35 corresponds to the objective signal, such as a racket of the ball game. The image pickup module 114 converts the large-area image 35 into digital signals, and then the processing module 12 processes the digital signals to produce a controlling signal. Finally, the controlling feedback module 13 feeds back the controlling signal to the host 30, in order to simulate the desired motion-based action (e.g., swinging, hitting, etc.), as required.

Compared with the conventional remote control module, the infrared detecting module 11 has the collimator device 116 that may be selectively placed into or moved away from the lens barrel 110. By such selective positioning of the collimator device 116, the present infrared remote control module 10 can be used for playing both shooting (e.g., point-focus) games and motion-based (e.g., hitting, swinging, etc.) games. Therefore, the infrared remote control module 10 may be applied for electronic devices for playing different types of games.

Figure 5:
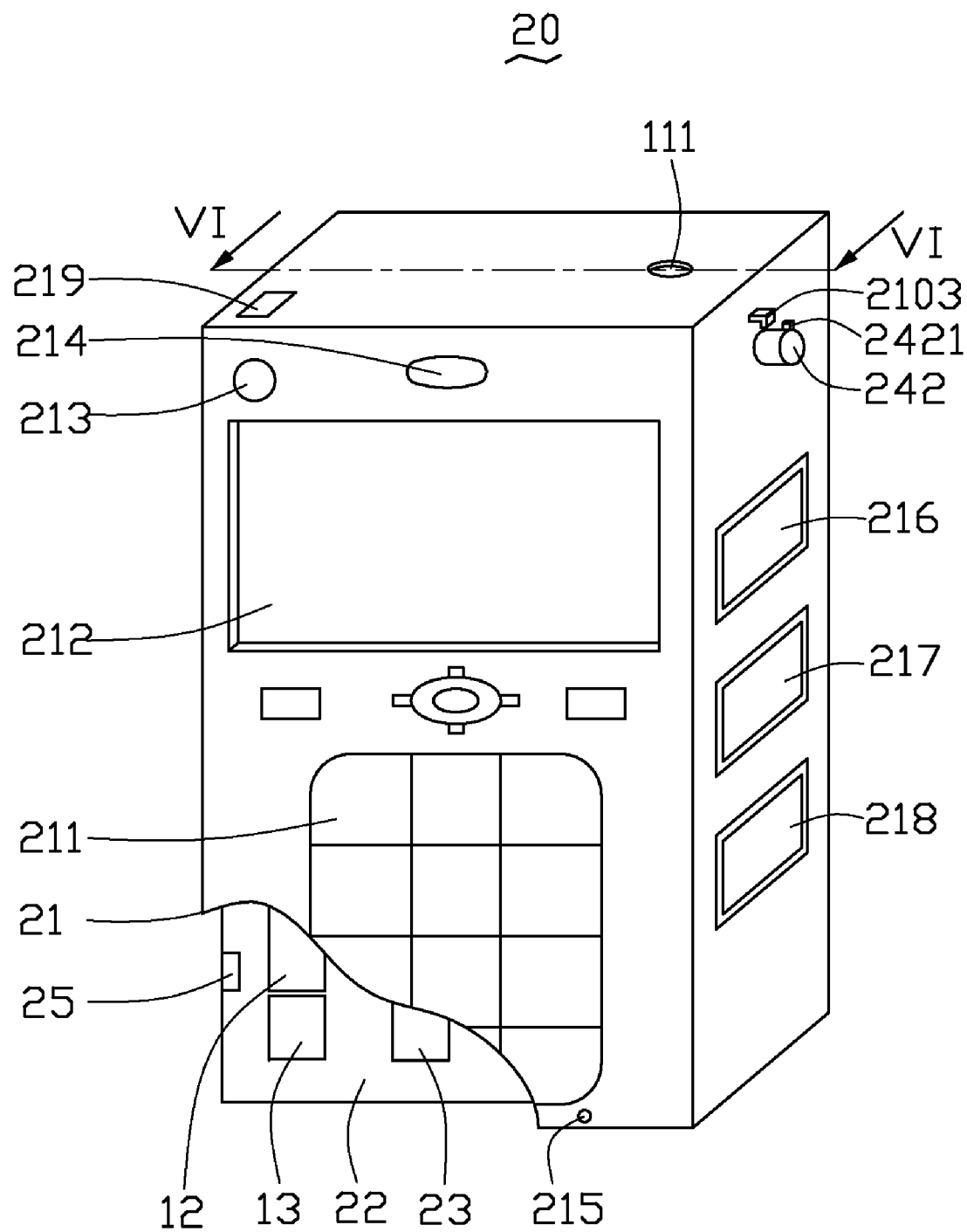
FIG. 5 is a schematic view of a portable electronic device, according to a second embodiment of the present infrared remote control module.

Referring to FIG. 5, a portable electronic device 20, in accordance with a second present embodiment, includes a shell 21, a printed circuit board 22 arranged inside the shell 21, and an infrared remote control module 10, as described above, arranged therein. The signal processing module 12 and the controlling feedback module 13 of the infrared remote control module 10 communicate with the printed circuit board 22. The incidence opening 111 of the lens barrel 110 is arranged immediately below and adjacent the inner surface of the shell 21 for receiving the optical signals from a host (not shown).

Figure 6:
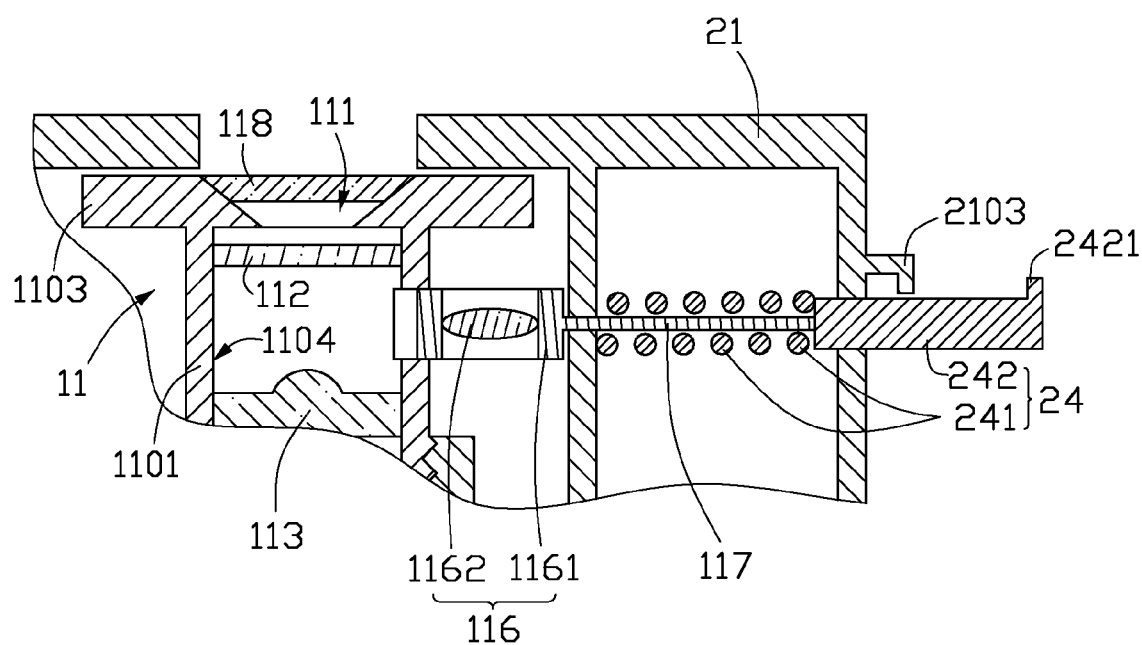
FIG. 6 is a schematic, partial cross-sectional view of the portable electronic device of FIG. 5.

Referring to FIG. 6, the portable electronic device 20 further includes a button 24 connected with the operation handle 117. The button 24 may include a spring 241 surrounding the operation handle 117 and a pressing body 242 extending from the operation handle 117. The spring 241 is under a compressed condition. The button 24 further includes a pin 2421 arranged on one distal end of the pressing body 242 remote/opposite from the operation handle 117, and a clasp 2103 is arranged on the shell 21 and is configured for locking the pin 2421 of the button 24. If the button 24 is not pressed, the spring 241 generates a force that causes the collimator device 116 to pull out of the lens barrel 110. And if the button is pressed, the collimator device 116 is pushed into the lens barrel 110, and the pin 2421 can be locked into the clasp 2103 to thereby retain the collimator device 116 in the optical path of the lens barrel 110.

The portable electronic device 20 further includes an acceleration sensing module 25, which communicates with the printed circuit board 22. The acceleration sensing module 25 is configured for sensing the motion of the portable electronic device 20 to promote a virtual reality effect, for increased player enjoyment.

The portable electronic device 20 may be a mobile phone, and, therefore, it may have a communicating module 23 for calling. The mobile phone 20 advantageously includes a display panel 212, a control panel 211, a blue-tooth port 219, a camera module 213, a loud speaker 214, and a microphone 215. Furthermore, the mobile phone 20 may further include a hard disk drive 216, an optical disk drive 217, and a memory slot 218 for enlarging its storage capacity.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An infrared remote control module, comprising:
    an infrared detecting module configured for receiving optical signals and converting the optical signals into digital signals, the infrared detecting module comprising:
    a lens barrel;
    an infrared band-pass filter arranged in the lens barrel, the infrared band-pass filter being configured for permitting infrared optical signals into the lens barrel and filtering other optical signals;
    a lens assembly arranged in the lens barrel;
    an image pickup module arranged in the lens barrel, the image pickup module being configured for converting the infrared optical signals into the digital signals, the infrared band-pass filter, the lens assembly and the image pickup module being coaxially and optically aligned;
    a collimator device selectably movable into or out of the lens barrel, the collimator device being configured for selectively collimating the optical signals;
    a signal processing module communicating with the image pickup module; and
    a controlling feedback module communicating with the signal processing module.

2. The infrared remote control module as claimed in claim 1, wherein the lens barrel comprises a base support and a main body threadedly engaged with the base support, the main body including a top portion and a sidewall extending from the top portion.

3. The infrared remote control module as claimed in claim 2, wherein the lens barrel further includes an opening formed in the sidewall of the main body, the collimator device being moveable into or out from the lens barrel through the opening.

4. The infrared remote control module as claimed in claim 1, wherein the collimator device comprises a collimator and a fixing ring in which the collimator is mounted.

5. The infrared remote control module as claimed in claim 4, wherein the infrared detecting module further comprises an operation handle extending from the fixing ring.

6. The infrared remote control module as claimed in claim 4, wherein the fixing ring has an outer diameter that is equal to an inner diameter of the lens barrel.

7. The infrared remote control module as claimed in claim 1, wherein the infrared band-pass filter has a band-pass wavelength in an approximate range of 800~1100 nanometers.

8. The infrared remote control module as claimed in claim 1, wherein the infrared band-pass filter comprises a transparent substrate and a plurality of oxide films, in series, arranged thereon.

9. The infrared remote control module as claimed in claim 8, wherein each of the oxide films is comprised of two different oxide coatings, each respective oxide coating having a different refractive index.

10. The infrared remote control module as claimed in claim 1, wherein the lens barrel further includes an incidence opening arranged within the top portion thereof, the incidence opening being coaxial with the infrared band-pass filter, the lens assembly, and the image pickup module.

11. The infrared remote control module as claimed in claim 10, wherein the infrared detecting module further comprises a protecting transparent cover arranged in the incidence opening.

12. The infrared remote control module as claimed in claim 1, wherein the lens assembly includes an aspheric lens.

13. A portable electronic device, comprising:
    a shell;
    a printed circuit board arranged in the shell;
    an infrared remote control module arranged in the shell, the infrared remote control module comprising:
    an infrared detecting module configured for receiving optical signals and converting the optical signals into digital signals, the infrared detecting module comprising:
    a lens barrel;
    an infrared band-pass filter arranged in the lens barrel, the infrared band-pass filter being configured for permitting infrared optical signals into the lens barrel and filtering other optical signals;
    a lens assembly arranged in the lens barrel;
    an image pickup module arranged in the lens barrel, the image pickup module being configured for converting the infrared optical signals into the digital signals, the infrared band-pass filter, the lens assembly and the image pickup module being coaxial and optically aligned;
    a collimator device selectably moveable into or out of the lens barrel, the collimator device being configured for selectively collimating the optical signals;
    a signal processing module communicating with the image pickup module and printed circuit board; and
    a controlling feedback module communicating with the signal processing module and the printed circuit board.

14. The portable electronic device as claimed in claim 13, wherein the lens barrel comprises a base support and a main body threadedly engaged with the base support, the main body including a top portion and a sidewall extending from the top portion.

15. The portable electronic device as claimed in claim 14, wherein the lens barrel further includes an opening formed in the sidewall of the main body, the collimator device being moveable into or out of the lens barrel through the opening.

16. The portable electronic device as claimed in claim 13, wherein the collimator device comprises a collimator and a fixing ring in which the collimator is mounted.

17. The portable electronic device as claimed in claim 16, wherein the infrared detecting module further comprises an operation handle extending from the fixing ring.

18. The portable electronic device as claimed in claim 17, further comprising a button arranged in the shell and connected with the collimator device.

19. The portable electronic device as claimed in claim 18, wherein the button comprises a spring surrounding the operation handle, a pressing body extending from the operation handle, and a pin arranged on one distal end of the pressing body remote from the operation handle; and further wherein a clasp being arranged on the shell, the clasp being configured for selectably locking the pin of the button in place.

* * * * *